G. W. MILLER.
WELL BUCKET.
APPLICATION FILED JUNE 22, 1920.
1,370,340.
Patented Mar. 1, 1921.
2 SHEETS—SHEET 1.
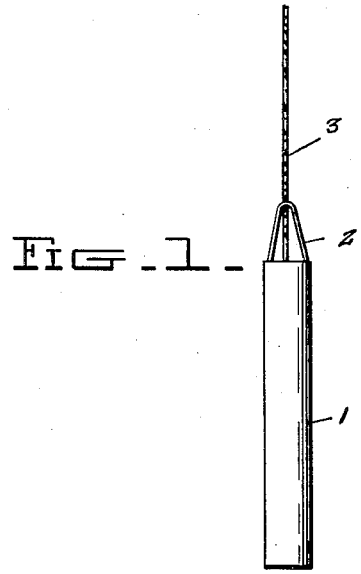
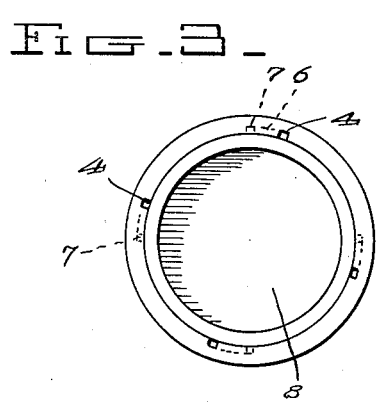
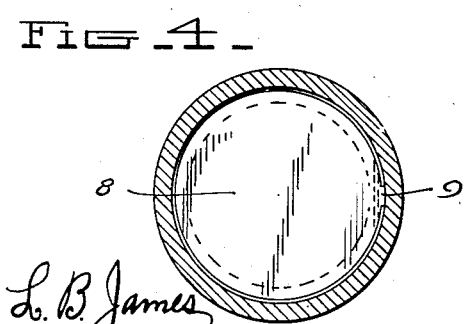
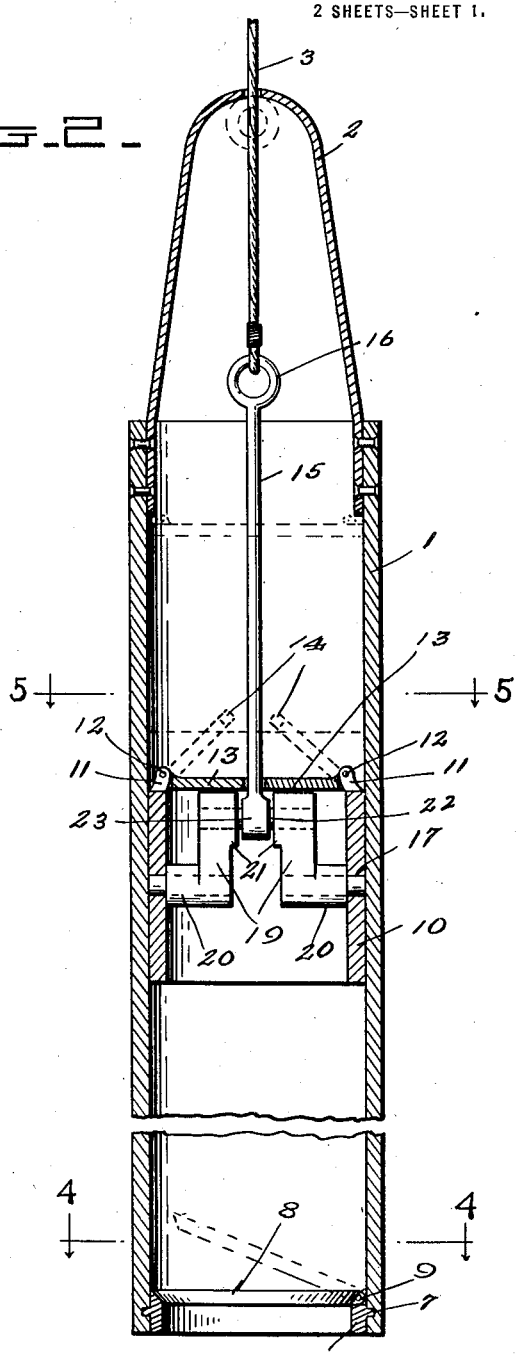
G. W. Miller INVENTOR
BY *Victor J. Evans*
ATTORNEY
WITNESS:
*L. B. James*

G. W. MILLER.
WELL BUCKET.
APPLICATION FILED JUNE 22, 1920.
1,370,340.
Patented Mar. 1, 1921.
2 SHEETS—SHEET 2.
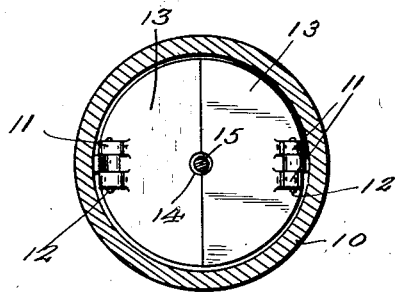
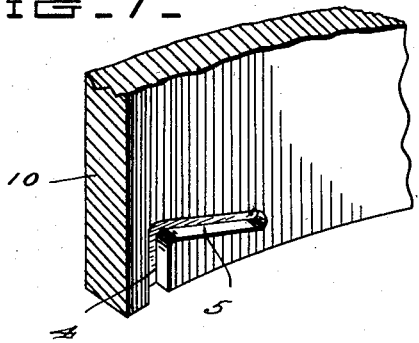
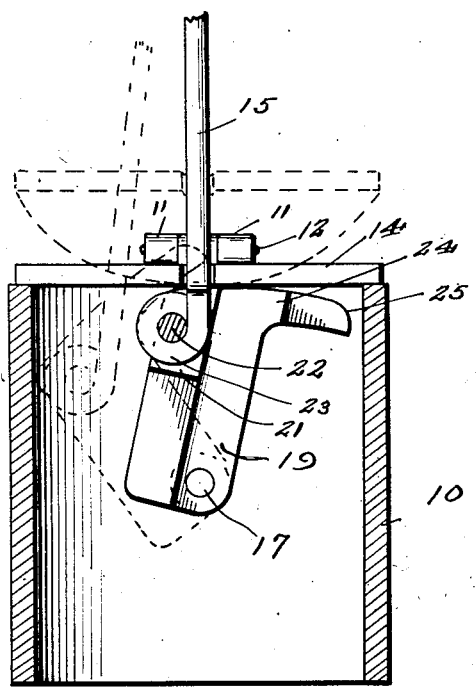
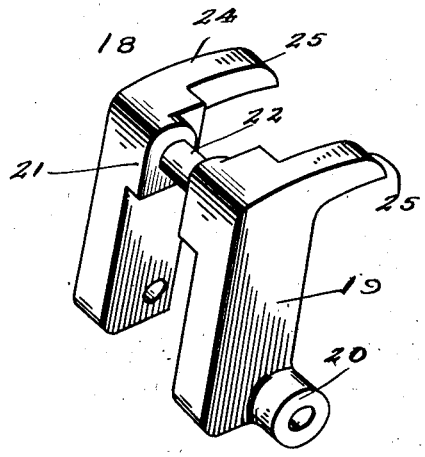
G. W. Miller
INVENTOR

UNITED STATES PATENT OFFICE.

GEORGE W. MILLER, OF MANSFIELD, MISSOURI.

WELL-BUCKET.

1,370,340. Specification of Letters Patent. Patented Mar. 1, 1921.

Application filed June 22, 1920. Serial No. 390,931.

*To all whom it may concern:*

Be it known that I, GEORGE W. MILLER, a citizen of the United States, residing at Mansfield, in the county of Wright and State of Missouri, have invented new and useful Improvements in Well-Buckets, of which the following is a specification.

My present invention has reference to a bucket which is primarily devised for removing mud and gravel from wells, but which is, of course, susceptible to other uses, such as for instance, an ordinary water bucket.

Among my objects are the provision in a bottom discharge bucket, of means whereby the lower valve may be expeditiously removed for cleaning both the bucket and the valve and as readily securely attached to the bucket; the arrangement in the bucket of a hollow plunger that has its top normally closed by hinged doors or valves; the arrangement of weighted means in the plunger attached to the bucket operating means for impelling the valves to open position when the plunger descends in the bucket on the slacking of the operating means, and the said impelling means serving as rests for the valves when the bucket and plunger are elevated, the space in the bucket between the plunger and the lower valve serving as a receptacle for the mud or gravel which is drawn into the bucket by the operation of the plunger.

The foregoing, and many other objects which will appear as the nature of the invention is better understood, may be accomplished by a construction, combination and operative arrangement of parts, such as is disclosed by the drawings.

It is to be understood that the drawings are merely an illustration of one form of the improvement reduced to practice, and that such changes may be made therefrom as fall within the scope of what is claimed.

In the drawings:—

Figure 1 is an elevation of a bucket constructed in accordance with this invention.

Fig. 2 is a greatly enlarged substantially vertical longitudinal sectional view therethrough.

Fig. 3 is a view looking toward the bottom of the bucket.

Fig. 4 is a sectional view on the line 4—4 of Fig. 2.

Fig. 5 is a sectional view on the line 5—5 of Fig. 2.

Fig. 6 is an enlarged fragmentary sectional view illustrating by the full lines the normal position of the impelling means for the valves of the plunger and by the dotted lines the manner in which the impelling means causes the opening of the valves.

Fig. 7 is a greatly enlarged fragmentary sectional view of the lower portion of the bucket, showing one of the bayonet slots therein which is designed to receive the pin or lug on the valve seat.

Fig. 8 is a perspective view of the weighted cam member that serves as the impelling means for opening the valves of the plunger.

As disclosed by the drawings, the bucket 1 is open at its ends. The bucket has secured to its upper end a substantially U-shaped bail 2 that is centrally provided with an opening through which passes the operating cable 3.

The bucket, at its bottom is provided with equidistantly spaced bayonet slots, the vertical passages 4 entering from the lower edge of the inner face of the bucket, and the longitudinal passages 5 being inclined downwardly, as clearly disclosed in Fig. 7 of the drawings.

The seat for the lower valve is in the nature of a ring member, and is designated by the numeral 6. The member 6 has on its outer surface spaced lugs 7 designed each to be received in the bayonet slots of the bucket. It will be apparent that when the lugs are received in the end and rounded wall of the longitudinal passages 5, of the bayonet slots, the ring seat 6 will be effectively sustained on the bucket as it must travel over the inclined walls of the said passages 5 to permit the removal thereof. The ring seat, however, can be readily removed by the operator, and of course, easily and quickly applied. The ring seat 6 has its inner or upper edge beveled for the reception of the inclined periphery of the valve 8. The valve 8 is hingedly secured to the seat, as at 9.

In the bucket is arranged for slidable movement, a plunger 10. The plunger comprises a hollow cylindrical member that has its outer edge provided, upon its diametrically opposite sides, with outstanding lugs 11 to which there are pivoted, as at 12, the valves 13 that provide the top of the plunger. The valves 13 are semi-circular in plan, and are designed to have their edges meet when closed. The meeting edges, at the center thereof, are each notched, as at 14 for the passage therethrough of a rod 15 that has its outer end provided with an eye 16 to which the cable 3 is attached.

Pivoted, as at 17—17 in the plunger 10, is the weighted cam element that serves as the means for impelling the valves 13 to open position and which also serves as a rest for the valves when in closed position. This element, broadly indicated by the numeral 18, comprises parallel arms 19 that have their lower ends formed with outturned bosses 20, and these bosses receive therein the pivots 17. The arms, at their upper and what I will term inner corners, have inturned portions or lugs 21 that serve to weight the same as well as a means for connecting the arms by a pintle 22. The rod 15 has its lower end provided with an eye 23 that engages said pintle 22. The arms 19, from the widened and weighted portions 21 are formed with parallel cam extensions 24—24. These extensions are really in the nature of fingers, being reduced at their outer portions and having their corners rounded, as at 25. The fingers 24 are in the path of contact with the respective valves 13, as disclosed by the dotted lines in Fig. 6 of the drawings.

The operation of the device may be briefly described as follows:

The cable 3 is taut so that the eye 16 of the rod 15 will contact with the outer end of the bail 2, as illustrated by the dotted lines in Fig. 2 of the drawings. This arranges the plunger near the top of the bucket. The bucket is lowered in the well. The flap valve 8 will open as soon as the same contacts with the water. When the bucket reaches the bottom of the well, the cable 3 is slackened, permitting the plunger to descend in the bucket. This permits of the impelling element 18 incident to the weighted portions 21 thereof to swing on the pivots 17 causing the fingers 24 to contact with the valves, and thus positively assure the opening of the said valves 13. Thus the water is permitted to flow into the bucket through the plunger. When the bucket is withdrawn from the well, the cable 3 is, of course, drawn taut. This causes the swinging of the impelling element 18 to its initial position, and likewise causes the closing of the valves 13 as well as the closing of the valve 8. The valves 13 will rest on the upper portions of the arms 20 of the impelling element, as disclosed in Fig. 6 of the drawings. The plunger is drawn upwardly to the position illustrated by the dotted lines in Fig. 2 of the drawings. The clear water will be arranged on the top of the valves, while the mud, dirt or gravel will be received in the bucket between the plunger and the lower valve 8. The upward movement of the plunger in the bucket when the valves 13 are closed creates a suction between the said plunger and the bucket, sufficient to open the valve 8 and to suck into the bucket heavy mud and gravel which is deposited between the valves 13 and the valve 8, when the latter is brought to its closed position by the weight of the said deposit thereon after the plunger has reached the limit of its upward movement in the bucket, and the bucket is raised. When the bucket is entirely withdrawn, the valve 8 is opened to discharge the mud, dirt or gravel. It frequently happens that the gravel gets between the valve 8 and its seat, and hence it is an absolute necessity to provide for the removal of the lower valve. The seats for the valves are ordinarily screwed to the bucket and the removal thereof requires both time and labor. Not infrequently the threads between the seat and the bucket become distorted, so that either a new valve seat or a new bucket must be provided. With my construction, it will be seen that the lugs of the valve seat may be readily removed from the bayonet slots in the bucket. The provision of the plunger 10 with the valves 13 is also an important feature of construction in this art. Because of dirt or sand, the valves might not freely open, and therefore the necessity of the impelling means. The impelling means, as previously stated, serve as rests for the valves when the latter are in closed position, and any dirt or sand collected on the top of the valves can drain from the opening through which the rod 15 passes.

It is thought that the foregoing description, when taken in connection with the drawings will fully set forth the advantages and simplicity of the construction to those skilled in the art to which this invention relates.

Having thus described the invention, what I claim, is:—

1. A bucket having open ends, for the purpose set forth, operating means for said bucket, a hollow plunger connected to the operating means and slidable in the bucket, valves at the upper end of the plunger, means in the plunger and actuated by the operating means for the plunger and bucket for impelling the valves to open position when the plunger is moved downward in the bucket, and a valve normally closing the lower end of the bucket.

2. A bucket having open ends, for the purpose set forth, a hollow plunger therein connected to the operating means for the bucket and susceptible to a longitudinal movement in the bucket, means for limiting the movement of the plunger in both directions, hinged valves closing the top of the plunger, means in the plunger and actuated by the operating means for impelling the valves to an open position when the plunger is moved downward in the bucket, and said means providing a support for the valves when the latter are in closed position, and a removable valve normally closing the bottom of the bucket.

3. In a bucket having open ends, for the purpose set forth, operating means therefor, a hollow plunger in the bucket weighted to normally move downward in the bucket and held against such movement by the operating means when the same is in one position with respect to the bucket, hinged valves at the top of the plunger, weight influenced means pivotally supported in the plunger and connected with the operating means, designed, when the plunger is lowered in the bucket to contact with the valves to impel the same to an open position and to serve as a support for the valves when the plunger is raised in the bucket, and an inwardly opening normally closed valve for the bottom of the bucket.

4. An open bucket for the purpose set forth, having bayonet slots at the bottom thereof and the horizontal passages of the said slots being arranged at a downward inclination, a valve seat having lugs received in the slots, a hinged valve on the seat opening into the bucket, operating means for the bucket, a hollow plunger associated with said means, pivoted valves on the top of the plunger, normally closing the same, and weighted means connected with the actuating means normally held in a position beneath the valves and designed, when a slack is imparted to the actuating means and the plunger descends in the bucket, to impel the valves to open position.

5. An open bucket for the purpose set forth, an inwardly opening valve in the bottom thereof, a seat therefor, a lug and groove connection between the seat and bucket, a bail on the outer end of the bucket, a flexible element passing therethrough connected with the operating means for the bucket, a hollow plunger in the bucket, pivoted weight influenced cam means in the plunger, a rod pivotally connected to said means and secured to the flexible element, outwardly opening valves pivotally secured to the upper end of the plunger and through which the rod passes, and said weight influenced cam means designed, when the plunger is lowered in the bucket, and the flexible element is slackened, to turn and engage with the valves to impel the same to open position, and when the flexible element is drawn taut and the rod is influenced thereby, to engage beneath and provide supports for the valves.

In testimony whereof I affix my signature.

GEORGE W. MILLER.